United States Patent [19]

Mullaney

[11] Patent Number: 5,020,809
[45] Date of Patent: Jun. 4, 1991

[54] HIGH-SPEED EASY-MAINTENANCE SPLIT SEAL

[75] Inventor: John J. Mullaney, Warwick, R.I.

[73] Assignee: EG&G Sealol, Inc., Providence, R.I.

[21] Appl. No.: 477,417

[22] Filed: Feb. 9, 1990

[51] Int. Cl.$^5$ ............................................. F16J 15/34
[52] U.S. Cl. ............................ 277/81 S; 277/93 SD; 277/190; 277/193
[58] Field of Search ............... 277/9, 9.5, 10, 81 S, 277/81 R, 82, 86, 87, 93 R, 93 SD, 94, 85, 192, 193, 190, 191

[56] References Cited

U.S. PATENT DOCUMENTS

| | | | |
|---|---|---|---|
| 1,009,303 | 11/1911 | Hansen | 277/09 |
| 4,239,240 | 12/1980 | Wilkinson | 277/84 |
| 4,792,146 | 12/1988 | Lebeck et al. | 277/93 SD X |

FOREIGN PATENT DOCUMENTS 933389  8/1963  United Kingdom ............. 277/81 R

OTHER PUBLICATIONS

Seals and Sealing Handbook, 1981, Gulf Publishing Company, pp. 242, 253-254.

Primary Examiner—William A. Cuchlinski, Jr.
Assistant Examiner—J. K. Folker
Attorney, Agent, or Firm—Finnegan, Henderson, Farabow, Garrett & Dunner

[57] ABSTRACT

A mechanical split seal includes a tapered carbon split seal ring and a silicon carbide split mating ring. The tapered seal ring is compressed by a tapered seal ring shell which has a split "O" ring disposed in the taper to provide even force and improved sealing. The shell is biased toward the seal ring by multiple springs retained by a non-split cup. The mating ring is supported by a gland which includes a split gland packing assembly for compressing packing material onto the shaft. Used as a pump seal, the seal can be cooled by circulation created by the fluid supplied from either the pump input or output.

14 Claims, 5 Drawing Sheets

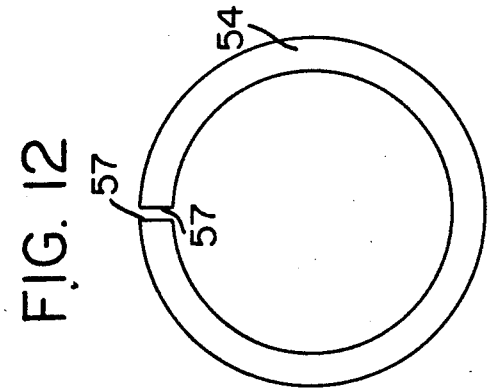
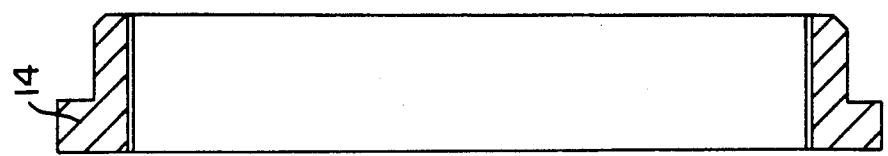
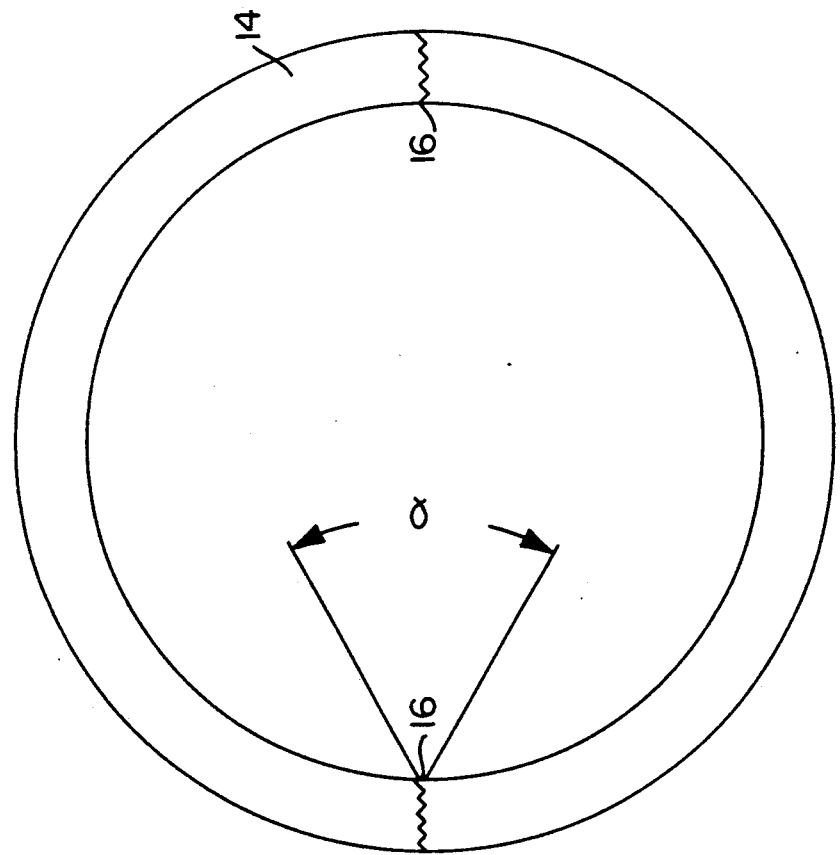

5,020,809

HIGH-SPEED EASY-MAINTENANCE SPLIT SEAL

BACKGROUND OF THE INVENTION

1. Field of the Invention

The present invention relates to a mechanical split seal for sealing along a shaft.

2. Description of the Related Art

Split seals are used in applications where solid seals would be difficult or time consuming to replace. It is not uncommon for a solid seal to require 24 hours to replace whereas a split seal for the same application may require only 1 hour.

Current split seals are normally bolted together, squeezed together with an "O" ring or squeezed together on a taper. Bolted split seals, as disclosed in U.S. Pat. No. 4,576,384 to Azibert, are expensive and require a large amount of space for the seal. Split seals that are squeezed together with an "O" ring are limited to low rotational speeds because centrifugal force opens the split halves at high rotational speeds. Finally, split seals that are squeezed together with a taper, as disclosed in U.S. Pat. No. 2,291,806 to Carter, require both the taper of the seal ring shell and the split seal ring to have near perfect surfaces in order to prevent leakage and misalignment of the seal ring split halves.

SUMMARY OF THE INVENTION

An object of the invention is to provide an improved split seal. A further object is to provide a split seal that can operate at high rotational speeds. A still further object of the invention is to provide a split seal with improved leakage resistance.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, a split seal for providing a seal between a housing and a shaft comprises: a stationary split mating ring attached to the housing; an annular rotary split seal ring having a sealing face abutting the mating ring and an outer tapered surface which tapers in decreasing diameter away from the sealing face; an annular seal ring shell having an inner tapered portion adapted for slidingly fitting over the outer tapered portion of the seal ring, the seal ring shell being fixed to rotate with the shaft; an annular groove formed in the inner tapered portion; an "O" ring fitted in the annular groove; and means for axially urging the shell toward the rotary split seal ring and the stationary split mating ring.

It is to be understood that both the foregoing general description and the following detailed description are exemplary and explanatory only and are not restrictive of the invention as claimed.

The accompanying drawings, which are incorporated in and constitute part of the specification, illustrate one embodiment of the invention and together with the description, serve to explain the principles of the invention.

BRIEF DESCRIPTION OF THE DRAWINGS

FIG. 2 is a rear view of a mating ring as used in the invention embodied in FIG. 1.

FIG. 3 is a cross-sectional view of the mating ring of FIG. 2.

FIG. 12 is a front view of an "O" ring as used in the invention embodied in FIG. 1.

DESCRIPTION OF THE PREFERRED EMBODIMENT

Figure 1:
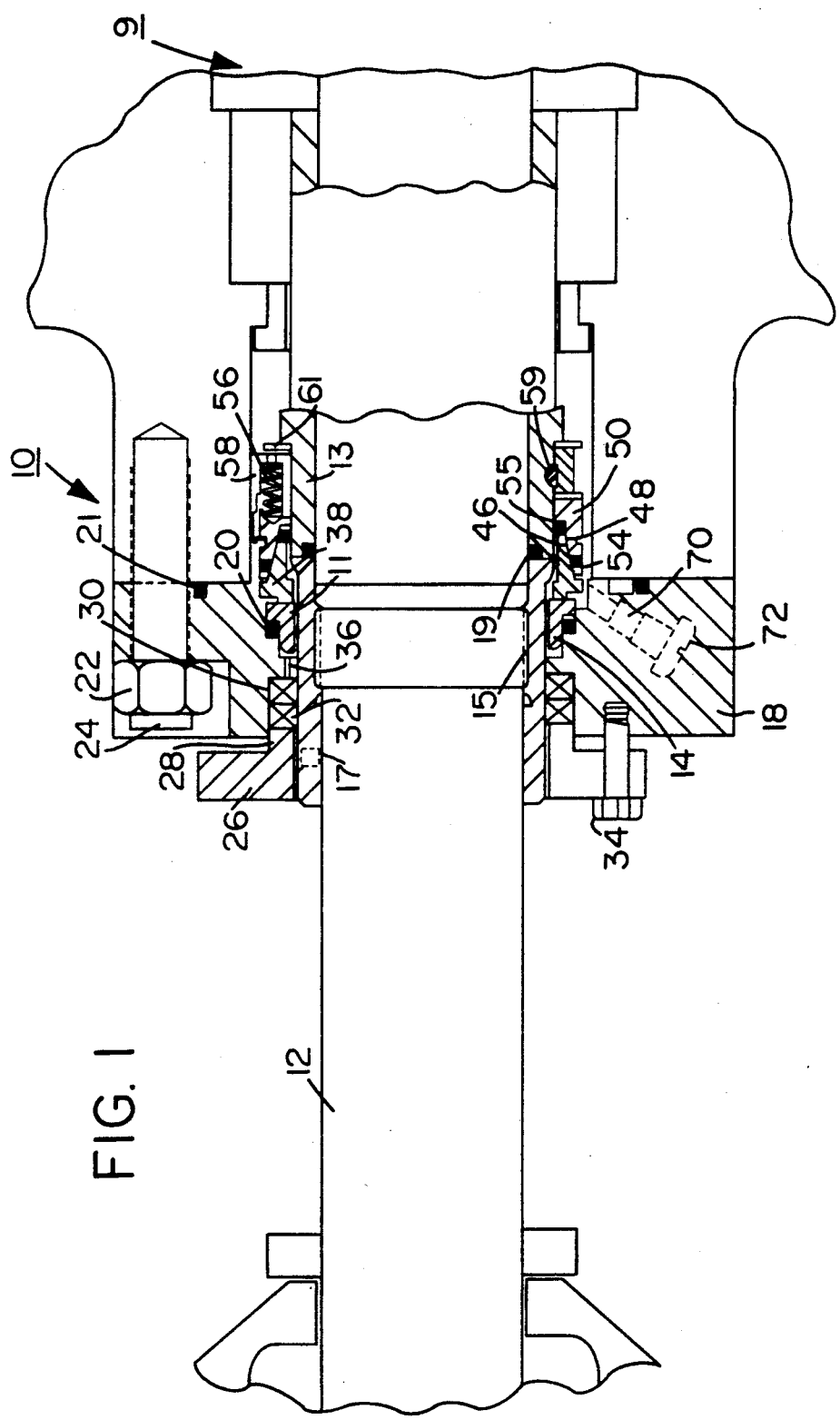
FIG. 1 is a cross-section of a split seal in accordance with the invention.

Reference will now be made in detail to the presently preferred embodiment of the invention, an example of which is illustrated in the accompanying drawings. Wherever possible, the same reference numbers will be used throughout the drawings to refer to the same or like parts.

The primary application of a split seal 10 for sealing along a shaft 12 according to this invention is in pumps. The seal fits in an existing seal cavity within pump housing 9. High pressure fluid in the pump exists along the shaft and to the radially outer side of the seal. Sleeve 11 and sleeve 13 surround the shaft. Sleeve 13 is installed first and abuts sleeve 11 which is threaded onto shaft 12 with threads 15 and secured from rotation by set screw 17. "O" ring 19 prevents leakage along the shaft.

Other applications for a split seal are, for example, mixers and ship shaft seals. The configuration of the seal will now be described with reference to FIG. 1.

In accordance with the invention, the split seal 10 comprises a stationary split mating ring 14. Mating ring 14 is preferably made of silicon carbide. As shown in FIGS. 2, the mating ring is preferably split into two sections. The ring is split by first forming two grooves 16 having an angle α of 60°±20° and then cracking the ring at the grooves. When assembled, mating ring 14 is squeezed together and attached by press-fit in gland 18, as shown in FIG. 1. Gland 18 is a removable portion of housing 9. Split "O"-ring 20 seals along the radially outer side of the mating ring and split "O" ring 21 seals between the gland and the housing. The gland is solid and preferably made of stainless steel. The gland retains the mating ring so that it does not rotate, and the gland is held in place by a plurality of nuts 22 and bolts 24. In order to aid in disassembly, means for selectively dislodging the mating ring is provided with set screw holes 36 in the gland so that set screws can be used to apply pressure to dislodge the mating ring.

The assembly includes a packing gland 26 behind the mating ring. The packing gland may be either split or solid and further has an annular tongue 28 which fits into an annular groove 30 in the gland 18. Packing material 32 (preferably Ramie) is placed around the shaft and the packing gland 26 is drawn toward the gland 18 by means of a plurality of cap screws 34. This causes the packing material to be compressed to seal along the shaft.

Figure 4:
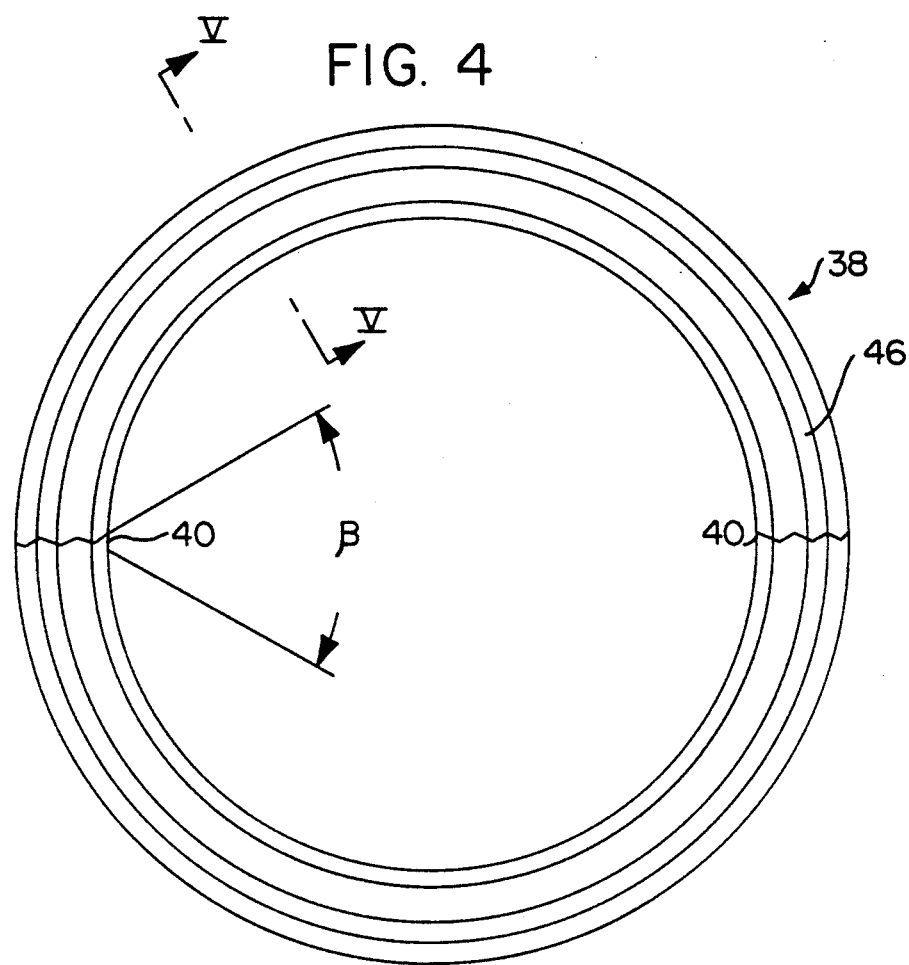
FIG. 4 is a rear view of a seal ring as used in the invention embodied in FIG. 1.

In accordance with the invention, the seal assembly also includes an annular rotary split seal ring 38. The split ring (best shown in FIGS. 4 and 5) is preferably made of carbon. As shown in FIG. 4, the seal ring is preferably split into two sections. The ring is split by first forming two grooves 40 having an angle $\beta$ of 60°±20° and then cracking the ring at the grooves.

Figure 5:
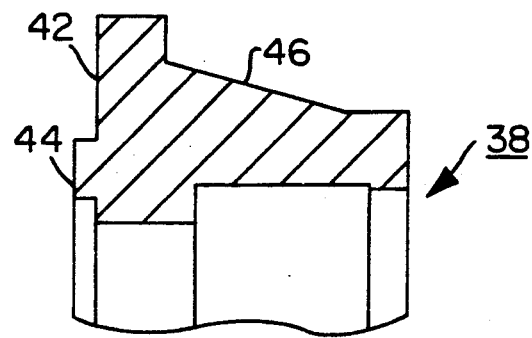
FIG. 5 is a partial cross-sectional view of the seal ring of FIG. 4 at Section V—V.

As shown in FIG. 5, the seal ring has a front surface 42 which faces the mating ring. Protruding from the front surface is a sealing face 44 which in operation is in pressing engagement with the mating ring 14. The sealing face is preferably lapped flat within 3 helium light bands./ Furthermore, the seal face is preferably aligned as known in the art to affect balance of the seal.

Figure 7:
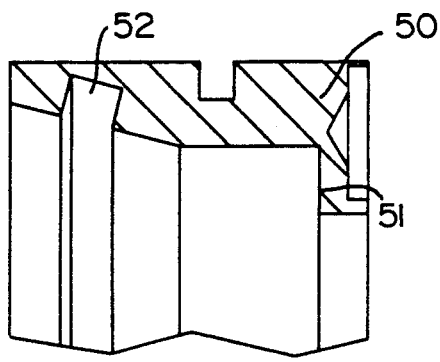
FIG. 7 is a partial cross section of the seal ring shell taken along lines VII—VII shown in FIG. 6.
Figure 8:
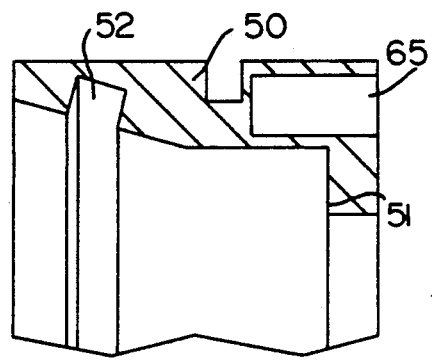
FIG. 8 is a partial cross-section of the seal ring shell taken along lines VIII—VIII shown in FIG. 6.
Figure 6:
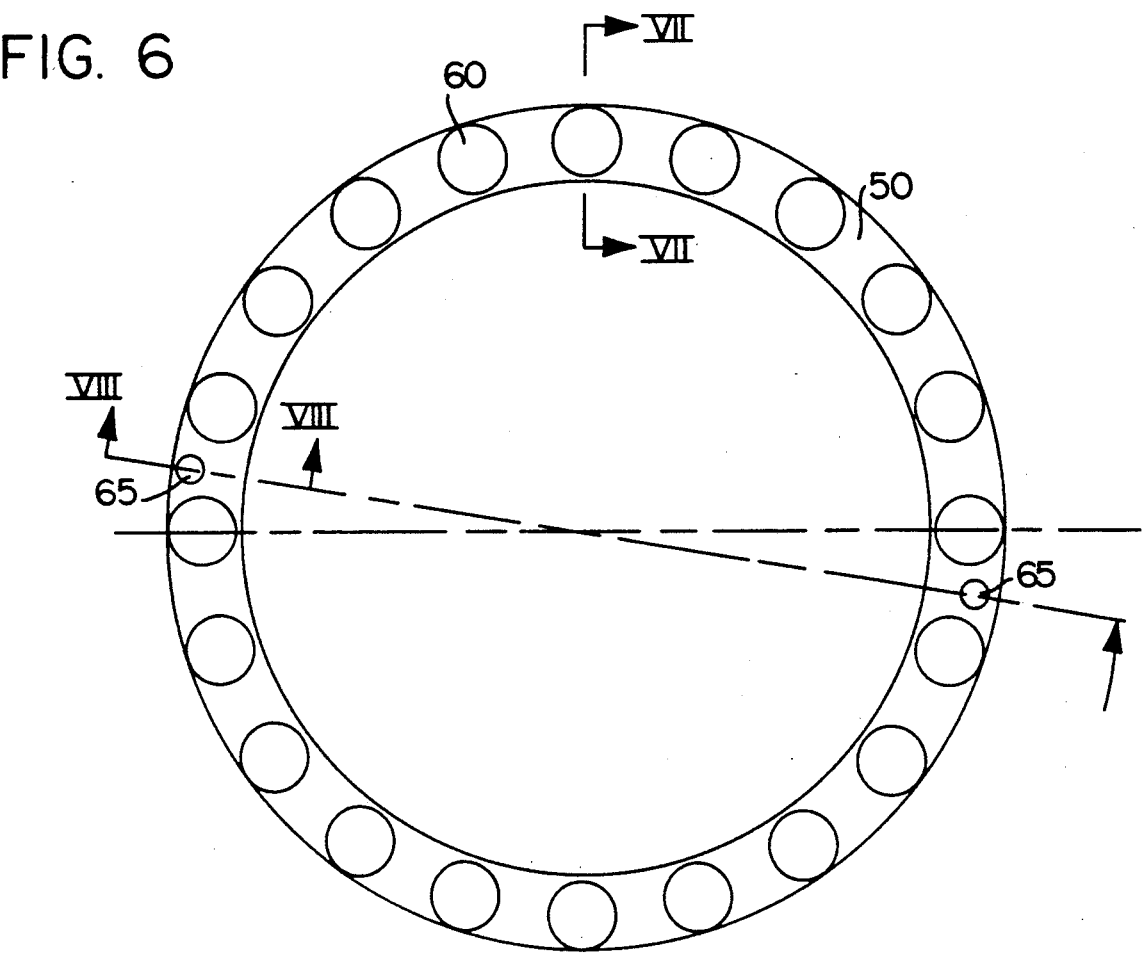
FIG. 6 is a rear view of the seal ring shell as used in the invention embodied in FIG. 1.

As shown in FIG. 1, the split seal ring is compressed and held in place by engagement between an outer tapered surface 46 of the seal ring which tapers in decreasing diameter away from the sealing face and inner tapered surface 48 on seal ring retainer shell 50 for slidingly fitting over the outer tapered portion of the split seal ring. As best shown in FIGS. 6, 7 and 8, shell 50 is preferably a solid annular form made of stainless steel. Furthermore, as shown in FIG. 7 and 8, an annular groove 52 is formed in the shell and a split "O" ring 54 (shown in FIG. 1) is located in the groove. An additional split "O" ring 55 is located between the rear surface of the seal ring (away from the sealing surface) and the rearward axially orthogonal wall 51 of shell 50.

Figure 9:
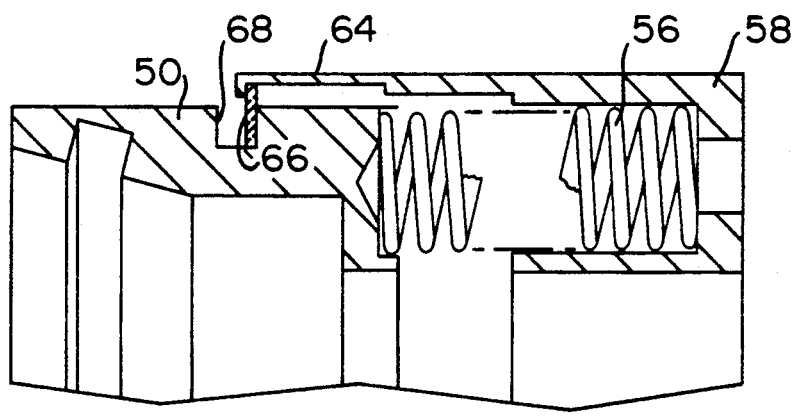
FIG. 9 is a partial cross-section of the cup and pin as used in the invention embodied in FIG. 1.
Figure 10:
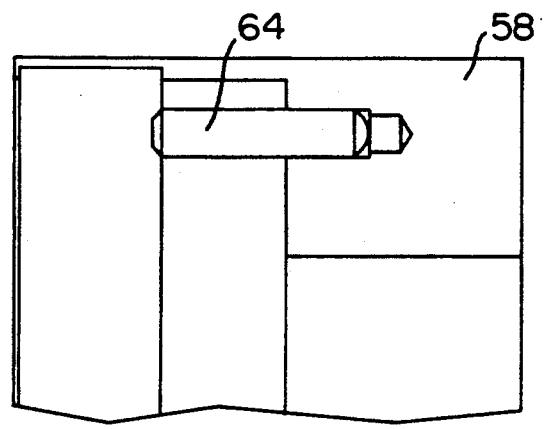
FIG. 10 is a partial cross-section of the cup at a pin hole.
Figure 11:
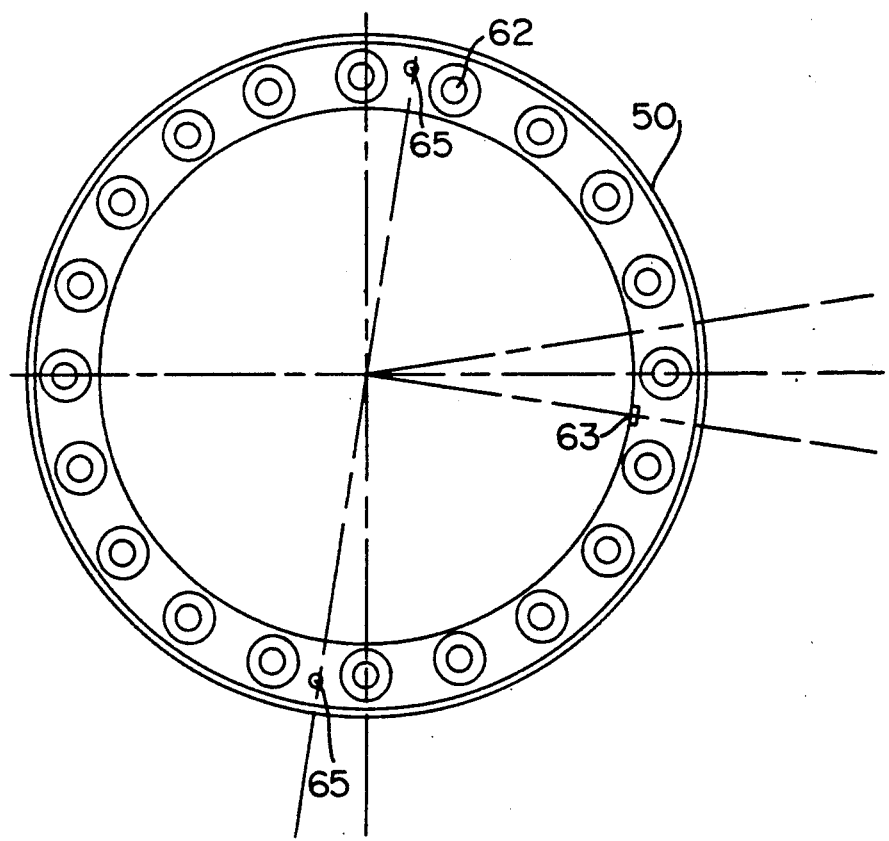
FIG. 11 is a front view of a cup as used in the invention embodied in FIG. 1.

As best shown in FIG. 9, means for axially urging shell 50 toward the split seal ring includes springs 56 which press against an annular non-split cup 58. In a preferred embodiment shown in FIG. 6, sixteen coil springs 56 are provided which rest in apertures or spring holes 60 in shell 50 and, as shown in FIG. 11, these springs also rest in the respective apertures or holes 62 in the bottom of cup 58. As shown in FIG. 1, a key 59 fits into key hole 63 (shown in FIG. 11) and acts to prevent rotation of the cup relative to the shaft. As a result, cup 58 rotates with the shaft. Shims 61 are supplied to position the seal to the correct operating length. As shown in FIG. 10, drive pins 64 are provided which pass from the cup 58 into drive pin holes 65 in the shell and serve to cause rotation of the cup 58, shell 50 and seal ring 38 with the shaft. Preferably, two pins are provided which fit into pin holes 65 (shown in FIGS. 6 and 11). Alternatively, the springs, which are fitted into deep pockets, may act as a drive to cause the rotation of the shell. Means for limiting axial sliding are preferably provided with an extended annular sidewall with an cross-sectionally "L" shaped annular finger section 64 on cup 58. The finger section extends over the rear portion of the shell 50 and clips onto a split retainer ring 66 placed in annular groove 68 in the shell. The retainer ring allows the springs to compress but keeps the cup and shell from separating.

The springs cause the two tapered portions and the split "O" ring to engage, which generates a high radial load that keeps the split halves together at high speeds. The axially load exerted by the springs 56 is transferred to the seal ring by taper 46 in a ratio of radial to axial forces determined by the angle of the taper. With a preferred angle of 15°, the radial load is approximately four times the axially load. As preferably embodied herein, the springs have a one inch free length and exert an axial load of between 5.5 lbs. and 7 lbs. when to compressed to one-half inch. The friction forces between the seal ring 38, split "O" rings 54 and 55, and the shell 50 cause the seal ring to rotate with the shell 50, and therefore with the shaft.

The volume of split "O" ring 54 is selected so that it is greater than the volume of groove 52. This ensures that the axial and radial load of the taper will be transferred through the split "O" ring. Since the load is transmitted through a rubber "O" ring, the force is distributed uniformly about the circumference of the split seal ring and leakage past the tapered diameter is eliminated. Furthermore, the load is always transmitted at the same axial location on the seal ring which insures that the seal rotation caused by the loads will be the same for all seals, and the seal ring deflection and stress can be easily be calculated for best seal ring operation.

In accordance with the invention, "O" rings 20, 21, 54 and 55 are split, as shown in FIG. 12. However, the split "O" rings of this invention require no bond or vulcanizing because the unstressed diameter of the "O" ring is slightly larger than the diameter of the groove in which it is placed. When pushed into the groove, the two butt ends 57 of the split "O" ring are squeezed together and sealed.

The split seal is preferably provided with cooling. As shown in FIG. 1, circulation port 70 is provided to circulate water into, around and out of the area near the seal face. The circulation port may be attached to either the intake or the exhaust port of the pump. Circulation is thus created around the sealing area because of a pressure differential between the pressure of the water being sealed and the port on the pump. The water is either drawn from the pump along the shaft and out the circulation port, or pushed into the pump along the shaft from the circulation port. It does not matter whether the water flows into or out of the circulation port as long as circulation is created. Alternatively, two circulation ports 70 may be provided, one for flowing water into the seal area and one for flowing the water out. Preferably, the circulation port 70 is threaded so that a plug 72 may be placed in it when the seal is not in use so as to prevent dirt from entering the seal.

Uncoupling of pump 9 from the motor is necessary only during original installation of the seal. Uncoupling allows the non-split items (i.e., the cup 58, seal ring shell 50 and gland 18) to be installed over pump shaft 12. The sixteen coil springs 56 are placed into cup 58, and the split "O" rings 54 and 55 are greased and put into the seal ring shell 50 prior to installation of the seal ring shell on the shaft. The seal ring shell with split "O" rings is then installed on the shaft. Next, the split seal ring 38 is placed into the seal ring shell until it touches split "O" ring 55. Then, gland 18 containing split mating ring 14 is installed on shaft 12, and nuts 22 on bolts 24 are tightened. Then, shaft packing material 32 is placed into split gland 26 and over shaft 12, and cap screws 34 are tightened. Finally, the water circulation tube is attached to circulation port 70.

The seal can now be removed without uncoupling the pump from the motor. The split packing gland 26 and packing material 32 are removed along with gland cap screws 24. Set screws are then screwed into set screw holes 36 in gland 18 to disengage the mating ring 14 from gland 18. The gland is then lifted and secured as far away from the pump housing as possible in order to the allow maximum axial space to remove the seal parts. Next, the split mating ring 14 and split seal ring 38 are removed. The split "O" rings 54 and 55, split seal ring 38 and the mating ring 14 can now be replaced and the seal re-assembled.

Thus, the seal of this invention has a major advantage over ordinary mechanical pump seals in that the sealing faces and all of the split "O" rings can be replaced without uncoupling the pump from the shaft. Furthermore, the seal is capable of operating at speeds of 1700 to 3500 rpm while leaking no more than 60 drops of water per minute.

It will be apparent to those skilled in the art the various modifications and variations can be made to the mechanical split seal of the present invention and in construction of this seal without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A split seal for providing a seal between a housing and a shaft comprising:
    a stationary split mating ring attached to the housing;
    a annular rotary split seal ring having a sealing face abutting said mating ring and an outer tapered surface which tapers in decreasing diameter away from said sealing face;
    an annular seal ring shell having an inner tapered portion adapted for slidingly fitting over said outer tapered portion of said seal ring, said seal ring shell being fixed to rotate with the shaft;
    means for axially urging said shell toward said rotary split seal ring and said stationary split mating ring; and
    means for uniformly transferring the urging force from said shell to said rotary split seal ring by providing a constant point of force between shell and ring and for preventing leakage along said rotary split seal ring, said means including an annular groove formed in said inner tapered portion, and an "O" ring fitted in said annular groove.

2. The split seal, as claimed in claim 1, wherein said split seal ring has a first surface facing toward said mating ring and wherein said sealing face extends over at least a portion of said first surface.

3. The split seal, as claimed in claim 2, wherein said split seal has a second surface axially away from said first surface, said seal ring shell has an axially orthogonal surface facing said second surface, and said split seal further comprises a second "O" ring between said second surface and said axially orthogonal surface.

4. The split seal, as claimed in claim 1, further comprising a third "O" ring pressingly engaged with an outer surface of said mating ring.

5. The split seal, as claimed in claim 1, wherein said first "O" ring is split and is greater in volume than the volume of said annular groove.

6. The split seal, as claimed in claim 1, wherein the means for urging includes at least one spring.

7. The split seal, as claimed in claim 1, wherein said means for urging includes:
    an annular cup having a bottom and an axially extended outer sidewall, said axially extended outer sidewall adapted for slidably receiving said seal ring shell; and
    at least one spring positioned between the bottom of said cup and said seal ring shell.

8. The split seal, as claimed in claim 7, further comprising at least one aperture formed in said bottom of said cup and at least one aperture formed in said shell facing said cup, said aperture of said cup and said aperture of said shell being aligned and carrying said spring.

9. The split seal of claim 7 further comprising means for limiting the axial sliding of said seal ring shell relative to said annular cup.

10. The split seal of claim 9 wherein limiting means includes an annular groove formed in said shell, a split retainer ring fit within and extending radially beyond said annular groove, and an annular "L" shaped axially elongated finger formed on said cup which projects over said retainer ring.

11. The split seal, as claimed in claim 7, further comprising drive pins passing from said cup into said shell.

12. The split seal, as claimed in claim 1, further comprising an annular gland removably fixed to said housing, said stationary mating ring press fit within said gland.

13. The split seal ring of claim 12 further comprising means for selectively dislodging said split stationary mating ring from said gland.

14. The split seal, as claimed in claim 13, wherein said "O" ring is a split "O" ring, thereby permitting the easy replacement of said mating ring, seal ring and "O" ring.

* * * * *